United States Patent
Glen et al.

(10) Patent No.: US 11,102,493 B2
(45) Date of Patent: *Aug. 24, 2021

(54) METHOD AND APPARATUS FOR IMAGE COMPRESSION THAT EMPLOYS MULTIPLE INDEXED COLOR HISTORY BUFFERS

(71) Applicant: ATI Technologies ULC, Markham (CA)

(72) Inventors: David Glen, Toronto (CA); Nicholas Chorney, Toronto (CA)

(73) Assignee: ATI Technologies ULC, Markham (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/440,078

(22) Filed: Jun. 13, 2019

(65) Prior Publication Data

US 2019/0297333 A1    Sep. 26, 2019

Related U.S. Application Data

(62) Division of application No. 15/475,322, filed on Mar. 31, 2017, now Pat. No. 10,368,079.

(51) Int. Cl.
*H04N 19/174* (2014.01)
*H04N 19/182* (2014.01)
*H04N 19/186* (2014.01)

(52) U.S. Cl.
CPC ......... *H04N 19/174* (2014.11); *H04N 19/182* (2014.11); *H04N 19/186* (2014.11)

(58) Field of Classification Search
CPC .. H04N 19/186; H04N 19/174; H04N 19/182; H04N 19/184
See application file for complete search history.

(56) References Cited

U.S. PATENT DOCUMENTS

| | | | |
|---|---|---|---|
| 9,363,517 B2 | 6/2016 | MacInnis et al. | |
| 10,368,079 B2* | 7/2019 | Glen | H04N 19/182 |
| 2014/0241630 A1 | 8/2014 | MacInnis et al. | |
| 2014/0247983 A1 | 9/2014 | MacInnis et al. | |
| 2014/0362098 A1 | 12/2014 | Kerofsky | |
| 2015/0350655 A1 | 12/2015 | Huang et al. | |
| 2016/0205399 A1 | 7/2016 | Walls | |

(Continued)

OTHER PUBLICATIONS

VESA Display Stream Compression (DSC) Standard; v. 1.2; Jan. 20, 2016; p. 1-146.

(Continued)

*Primary Examiner* — Jon Chang
(74) *Attorney, Agent, or Firm* — Faegre Drinker Biddle & Reath LLP

(57) ABSTRACT

A single source image encoder encodes more than one display stream, such as multiple display streams each for a different display or multiple display streams for the same display, using multiple indexed color history (ICH) buffers. As applied to a DSC encoder, the same DSC encoder is used to encode more than one DSC compliant display stream. Multiple encoded display bitstreams are output as multiple display data streams to a plurality of displays. Such a configuration can significantly reduce the area cost of an integrated circuit that employs an image encoder since additional encoders are eliminated.

7 Claims, 7 Drawing Sheets

(56) References Cited

U.S. PATENT DOCUMENTS

2016/0301950 A1\* 10/2016 Jacobson ............. H04N 19/124
2017/0150150 A1\* 5/2017 Thirumalai ............ H04N 19/14
2018/0288426 A1 10/2018 Glen

OTHER PUBLICATIONS

Walls, Frederick; VESA Display Stream Compression; Mar. 3, 2014; pp. 1-5.
Walls, et al.; VESA Display Stream Compression for Television and Cinema Applications; IEEE Journal on Emerging and Selected Topics in Circuits and Systems; vol. 6, No. 4; Dec. 2016; pp. 460-470.
U.S. Patent and Trademark Office; Non-Final Rejection; U.S. Appl. No. 15/475,322; dated May 18, 2018.
U.S. Patent and Trademark Office; Final Rejection; U.S. Appl. No. 15/475,322; dated Dec. 7, 2018.

\* cited by examiner

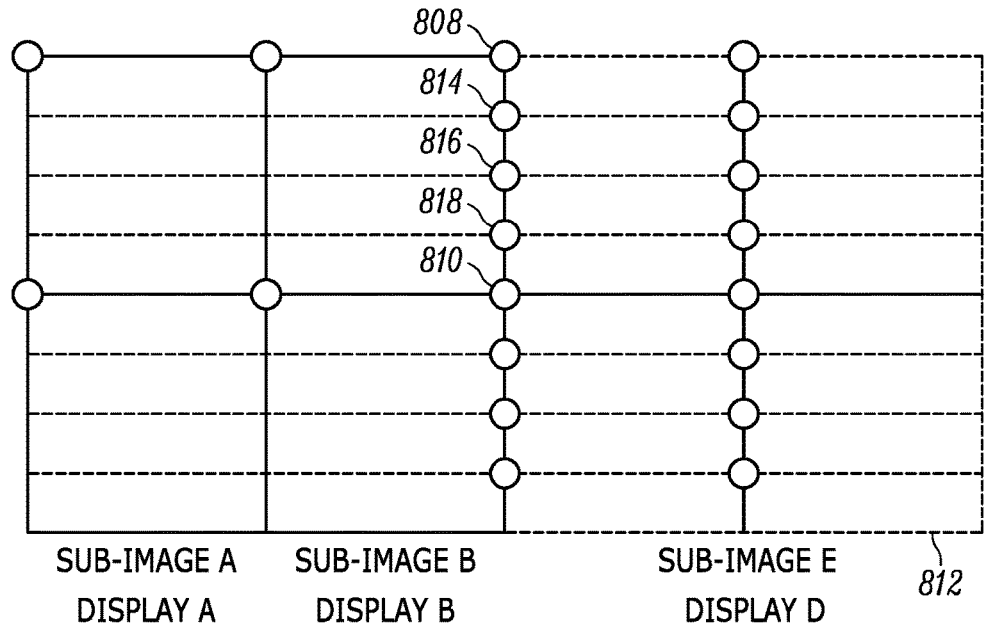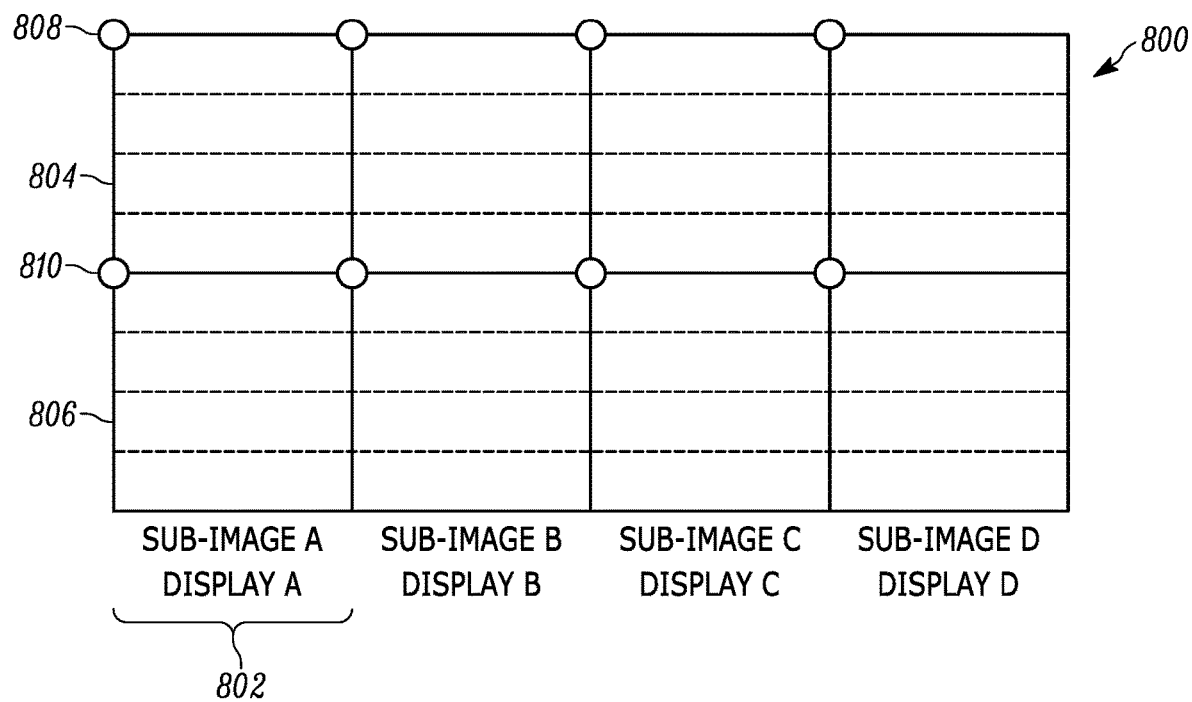
FIG. 8

METHOD AND APPARATUS FOR IMAGE COMPRESSION THAT EMPLOYS MULTIPLE INDEXED COLOR HISTORY BUFFERS

RELATED APPLICATIONS

This application is a divisional application of application Ser. No. 15/475,322, filed Mar. 31, 2017, having inventors David Glen et al., titled "METHOD AND APPARATUS FOR IMAGE COMPRESSION THAT EMPLOYS MULTIPLE INDEXED COLOR HISTORY BUFFERS", which is incorporated herein by reference.

FIELD OF THE DISCLOSURE

The disclosure relates to methods, apparatus and systems that provide image compression and decompression.

BACKGROUND OF THE DISCLOSURE

Various apparatus such as game consoles, desktop computers, laptop computers, smartphones, tablets, servers, integrated circuits and other devices may employ video image compression and/or decompression to reduce the bandwidth used to communicate video images which may be made up of large amounts of pixel data. Compressing video images can also speed up operation of computing devices or systems and/or reduce memory costs and overall system costs.

An example of an industry standard video image compression technique is referred to as Display Stream Compression (DSC) which is a VESA industry standard for real-time lossy image compression. Display manufacturers are producing high resolution displays to differentiate their products and increased pixel counts require increased bandwidth over the links that drive these displays. Accordingly, compressing the video images prior to communicating the information over display links is a much desired solution. The display stream compression standard (such as DSC 1.2a), is typically employed in video system since it allows for a display stream (i.e., sequence of image frames) to be compressed in raster scan order. For example, input pixels are scanned in line by line from left to right by the encoder that compresses the source images. The DSC standard defines a method for both the encoding operation and the decoding operation.

Referring to FIG. 1, a block diagram of an encoding system such as one compliant with DSC 1.2a industry standard shows a source image 100 which is an image in a video sequence for display on a display 102. The source image 100 is compressed by an encoder 104 which produces a bitstream 106 which is transmitted via display link either wirelessly or in a wired fashion (including optical) to a decoder 108 and is typically located within the display 102. The decoder 108 decompresses the compressed image in the bitstream 106 and the display 102 displays the source image frame as a reconstructed image frame 110 on the display 102. The encoder 104 uses a single indexed color history buffer shown as 112 to encode the source image into an encoded bitstream 106 for display on a single display. The decoder 108 also has a copy of the ICH buffer 112 shown as ICH buffer 114 which is used in the decoding process to decode the encoded bitstream 106 and produce the reconstructed image 110.

Referring also to FIG. 2, in DSC 1.2a, the source image 100 which has a certain resolution defined by its picture height 200 and its picture width 202 based on a number of pixels in the vertical and horizontal directions that are on the display, as known in the art. The picture height (PIC_HEIGHT) in the picture width (PIC_WIDTH) corresponds to the pixels in the vertical and horizontal direction on the single display that will display the source image when it is decoded. The SLICE_WIDTH 206 is the horizontal pixel slice width. In this example, a source image that is to be displayed on a single display is segmented into horizontal slices having the same width. The source image 100 is broken up into equal sized segments called "slices" shown as 204. Each slice is coded independently from all other slices. The independence between slices allows for an image to be compressed by one DSC encoder or multiple DSC encoders each having a single indexed color history buffer, as long as the assembled bitstream 106 is DSC 1.2a compliant. In this example, the input image or source image is segmented into four slices in the horizontal direction and two slices in the vertical direction. The number of slices in the horizontal and vertical directions can be arbitrary. Each slice is compressed (i.e., encoded) using a combination of four different algorithms: a Modified Medium-Adaptive Prediction (MMAP) algorithm, a Mid Point Prediction (MPP) algorithm, a Block Prediction (BP) algorithm and an Indexed Color History (ICH) algorithm.

Considering slices in the horizontal direction, the ICH buffer is a history cache which stores previously coded pixels. In the DSC 1.2a standard the ICH buffer is a 32-entry pixel history cache however any suitable configuration may be used. The DSC 1.2a encoder and a DSC 1.2a decoder are required to maintain identical ICH buffer state. If source image pixels exist in the ICH buffer, based on weighted selection criteria, the ICH buffer entries containing the source image pixels can be referenced via their indices and coded into the DSC 1.2a Bitstream. Depending on the source image content, the cost of referencing pixels in the ICH buffer can be less than the cost of the MMAP, MPP, and BP coding algorithms in terms of bits. It is desirable to encode pixels with the least amount of bits as possible as this frees up additional bits in DSC 1.2a's bit budget for regions of the image that are harder to compress and, therefore, require more bits. Since the encoder and decoder maintain identical ICH buffer states, the decoder can reconstruct the source pixels from the ICH buffer using the referenced indices.

On the first line of each slice, all 32 entries of the ICH point to previously coded pixels. On all other lines of the slice, the first 25 entries point to previously coded pixels (e.g., most recently used) while the remaining 7 entries point to pixels to the left, directly above, and to the right of the current pixels being coded.

The DSC 1.2a standard mandates the following ICH buffer behaviors. For images that have exactly one slice in the horizontal direction, at the beginning of each slice, all entries of the ICH are reset (invalidated). For images that have more than one slice in the horizontal direction, at the beginning of each slice, all entries of the ICH are reset (invalidated) and at the beginning of all other lines of each slice, the first 25 entries which point to actual history entries are reset (invalidated).

Based on the DSC 1.2a ICH buffer behavior and the fact the DSC 1.2a is designed to process images in raster scan order, ICH buffer elements can be reused when the encoder and decoder transition from one line of a slice to the next line of a slice in the horizontal direction. It should also be noted that the number of slices in the vertical direction have no impact on the ICH buffer behavior as the next vertical slice coding does not start until the current vertical slice coding has completed. Thus, the mandated ICH buffer behavior in DSC 1.2a requires a single instance of an ICH buffer in an encoder and decoder.

However, when encoding for multiple different displays, each having its own bitstream, the encoder 104 using the ICH buffer invalidation behavior for multiple slices in the horizontal direction, is forced to invalidate the shared ICH buffer elements and a bitstream carrying only a single horizontal pixel slice for a display would have incorrect ICH invalidation behavior. When bitstream 106 is split into one bit stream per horizontal slice, the ICH reset behavior for each slice is "Reset at beginning of slice and each line of each slice" because the encoder uses the DSC 1.2a standard reset behavior. When each decoder device receives it's (split) bitstream, it is expecting that the ICH is reset only at the beginning of each slice. There would be a mismatch between the encoder and the decoder in that the expected ICH reset behavior in the decoder would not match the actual reset behavior used. This would lead to incoherent ICH buffers and would cause a corrupted image to be displayed on the decoder device.

One solution is to duplicate the encoder 104 and its associated ICH buffer 112 for each display for which the source image 100 is displayed on. However, replicating the encoders 104 multiple times is very costly in terms of integrated circuit real estate and can increase power consumption which may not be desirable for mobile devices that rely heavily on battery power.

BRIEF DESCRIPTION OF THE DRAWINGS

The disclosure will be more readily understood in view of the following description when accompanied by the below figures and wherein like reference numerals represent like elements, wherein:

FIG. 6 is a flowchart illustrating one example of a method for encoding source image as set forth in the disclosure;

FIG. 8 diagrammatically illustrates multi-indexed color history buffer reset behavior in accordance with one example set forth in the disclosure.

DETAILED DESCRIPTION OF EMBODIMENTS

Figure 1:
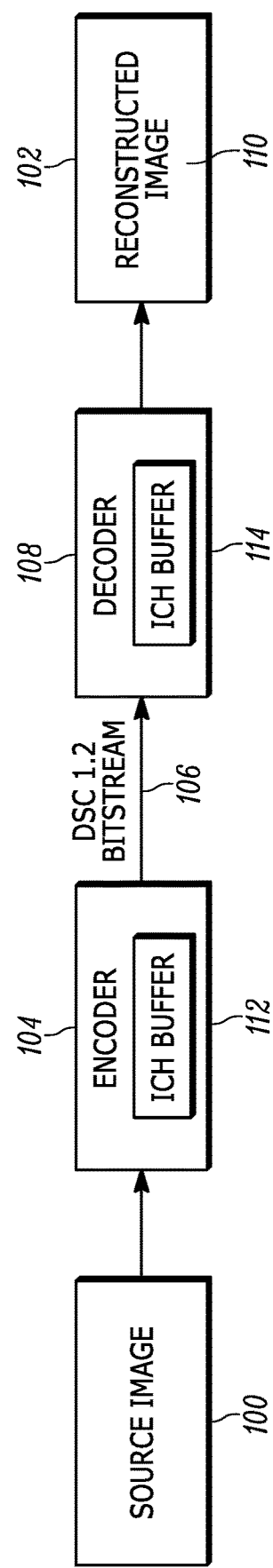
FIG. 1 illustrates one example of a prior art image compression system.
Figure 2:
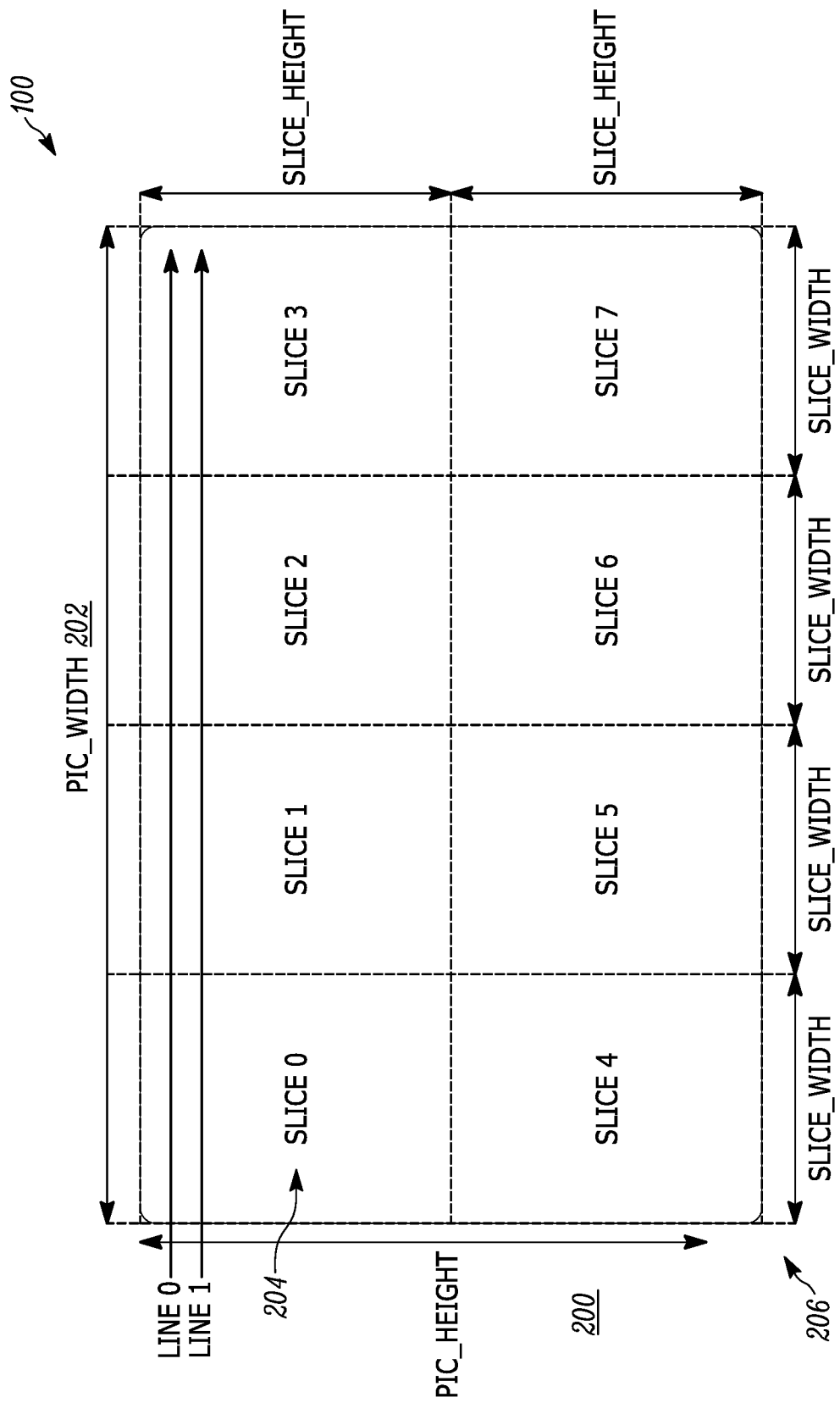
FIG. 2 is a diagram illustrating a prior art segmentation of a source image for output to a single display.

A single source image encoder encodes more than one display stream, such as multiple display streams each for a different display, using multiple indexed color history buffers. As applied to a DSC encoder, the same DSC encoder is used to encode more than one DSC compliant display stream. Multiple encoded bitstreams are output as multi-streams to a plurality of displays. Such a configuration can significantly reduce the area cost of an integrated circuit that employs an image encoder since additional encoders are eliminated. In another example, multiple ICH buffers are used to produce one display stream output for one display but the decoder in the display employs corresponding multiple ICH buffers which can improve image quality. In this example, there is a greater chance that pixels can be encoded using the ICH entries which may mean that more bits in a bit budget may be available for harder to compress parts of the source image using either MPP, MMAP, or BP encoding schemes. Other advantages will be recognized by those of ordinary skill in the art. Corresponding methods and systems are also disclosed.

In one example, an image encoder apparatus encodes a source image that is segmented into a plurality of sub-images each having a sub-image pixel width. The apparatus includes a plurality of indexed color history (ICH) buffers and an encoder, operatively coupled to the plurality of ICH buffers. The encoder encodes different horizontal pixel slices of a plurality of sub-images using the plurality of ICH buffers associated with the source image to produce encoded pixel data. In one example, each of the plurality of indexed color history (ICH) buffers is configured to correspond to a single horizontal pixel slice. In some examples, a sub-image has a same pixel width as the horizontal pixel slice or there may be multiple horizontal pixel slices for one sub-image. The encoder outputs the encoded pixel data for the different horizontal pixel slices of the plurality of sub-images.

In one example, the encoder includes control logic, such as a register that provides control data per ICH buffer to independently control each of the plurality of indexed color history (ICH) buffers to reset ICH buffer entries in each of the plurality of ICH buffers at the beginning of each horizontal pixel slice. Also, the resetting can occur at the beginning of each horizontal pixel slice (also referred to herein as a horizontal slice) and at the beginning of each line in the slice. In one example, the encoder is responsive to control data to use different indexed color history (ICH) buffer reset behavior for different ones of the plurality of ICH buffers associated with the source image, depending on whether a pixel width of a corresponding horizontal pixel slice is equal to or a multiple of the sub-image pixel width of a corresponding sub-image.

In one example, the encoder is operative to apply different ICH buffer reset behavior such that when the pixel width of the corresponding horizontal pixel slice is equal to the sub-image pixel width of a corresponding sub-image, the encoder resets entries in an associated ICH buffer of the plurality of ICH buffers, at the beginning of each horizontal pixel slice. When the sub-image pixel width of a corresponding sub-image is a multiple pixel width of the corresponding horizontal pixel slice (includes 2 or more horizontal pixel slices) the encoder resets the associated ICH buffers of the plurality of ICH buffers at the beginning of each horizontal pixel slice in the sub-image and resets the associated ICH buffers at the beginning of all other lines of each horizontal pixel slice in the sub-image. For example, at the beginning of each slice, all entries of the ICH are reset (invalidated) and at the beginning of all other lines of each slice, the first 25 entries which point to actual history entries are reset (invalidated).

To provide multi-stream output for multiple displays, the encoder includes a bitstream splitter operative to produce multiple display data streams for a plurality of display devices by producing a plurality of independent encoded bitstreams from the encoded pixel data, each encoded bit stream corresponding to a different respective sub-image of the source image. In one example, the bitstream splitter includes a stream de-multiplexer, operatively coupled to the encoder and a plurality of display stream queues (memories)

operatively coupled to the stream de-multiplexer. The stream de-multiplexer demuxes the encoded pixel data from the plurality of sub images from the encoder and accumulates encoded pixel data for each respective sub-image in respective display stream queues and outputs the queued data in the display stream queues as the independent encoded bitstreams for a respective display of a plurality of displays.

In one example, the apparatus employs a source image slicer that segments the source image into the plurality of sub-images each aligned to horizontal slice boundaries such that no horizontal slice contains pixels data from any two adjacent images, each sub-image corresponding to a different display and a multi-ICH buffer controller operative to provide multi ICH buffer control data to the control logic, indicating at least one of: when a sub image width equals a horizontal slice width and when a sub image width is a multiple of a horizontal slice width.

Figure 3:
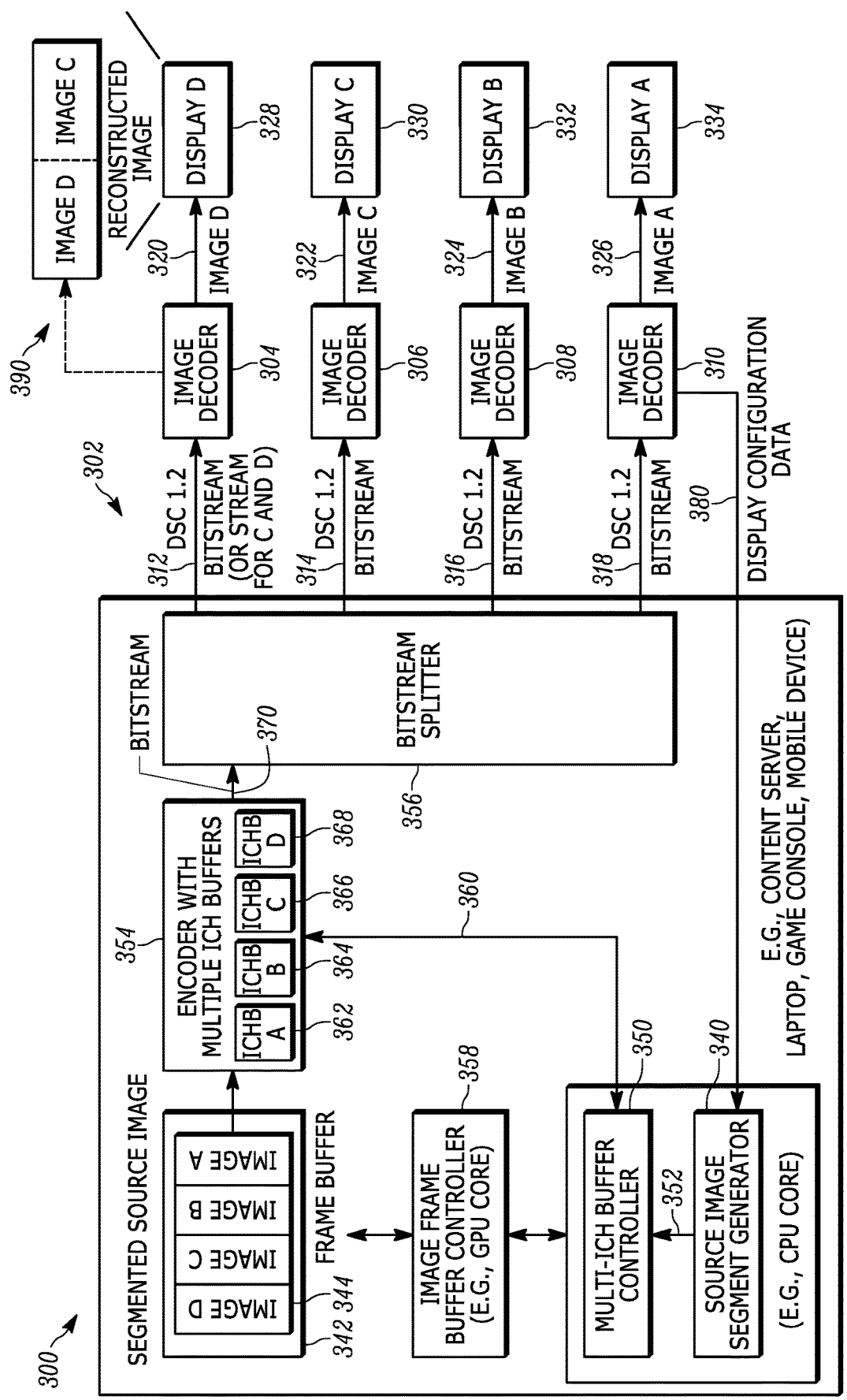
FIG. 3 is a block diagram illustrating an image compression system in accordance with one example set forth in the disclosure.

FIG. 3 illustrates one example of an image encoder apparatus 300, such as but not limited to, a game console, laptop, desktop, content server, mobile device, integrated circuit or any other suitable device that provides source image encoding for video. The image encoder apparatus 300 provides, in this example, encoded multi-streams 302 to each of a plurality of image decoders 304, 306, 308 and 310. Each of the image decoders 304-310 decode a respective encoded bitstream 312, 314, 316 and 318 and produce decoded sub-images 320, 322, 324 and 326 that are output on differing display shown as 328, 330, 332 and 334 respectively.

The image encoder apparatus 300 includes a source image segment generator 340 that segments a source image, such as a single large surface, or single frame that is to be displayed across four displays, in this example, 328-334. It will be recognized that any suitable number of displays can be employed. The source image segment generator 340 obtains source images from a frame buffer 342 or any other suitable source. The source image segment generator 340 segments a source image into a plurality of sub-images A-D shown as 344. The source image segment generator 340 segments the sub-images such that each sub-image has a sub-image width, in this example, also equals a horizontal pixel slice width used by the encoder 354. In this example, there are four sub-images A-D however any suitable number may be employed. Each of the plurality of sub-images is aligned to a horizontal pixel slice boundary such that no horizontal pixel slice contains pixel data from any two adjacent sub-images. Each sub-image in this example is displayed to a respective different display 328-334.

The image encoder apparatus 300 also includes a multi-ICH buffer controller 350 that receives ICH buffer assignment data 352 from the source image segment generator 340 which informs the multi-ICH buffer controller 350 which of the plurality of ICH buffers are assigned to which sub-images for encoding. For example, if the source image segment generator 340 segments the source image into four equal pixel widths that align with a horizontal pixel slice then four ICH buffers are assigned to use as part of the encoding process.

The image encoder apparatus 300 also includes an encoder 354 with multiple ICH buffers as well as a bitstream splitter 356 which serves as a multi-bitstream generator. The apparatus 300 also includes an image frame buffer controller 358 which is used to store the source image frame as sub-images. The sub-images are designated by address locations of a frame buffer that stores the source image as known in the art.

The multi-ICH buffer controller 350 provides multi-ICH buffer control data 360 to the encoder with multiple ICH buffers 354. More particularly, as further described below, the encoder with multiple ICH buffers 354 includes control logic that is responsive to the control data 360. The multi-ICH buffer control data 360 controls how each of the multiple ICH buffers are controlled. If desired, it also indicates at least when a sub-image width equals a horizontal pixel slice width and when a sub-image width is a multiple of the horizontal pixel slice width.

The image encoder apparatus 300 serves as an image encoder apparatus that encodes a source image that is segmented into a plurality of sub-images 344. Each of the sub-images has a sub-image pixel width, which in this example corresponds to the display width of an entire display 328-334. As such, when an encoded sub-image is provided to one of the plurality of displays 328-334 its decoded counterpart serves as an entire display frame for a respective display.

The encoder 354 with multiple ICH buffers includes multiple indexed color history buffers 362, 364, 366 and 368 each corresponding to one of the plurality of sub-images 344. The ICH buffers may be implemented using any suitable memory architecture such as cache memory as well as any suitable memory technology such as DRAM, RAM or any other suitable memory.

Stated another way, each of the multiple ICH buffers 362-368 is independently used in part of the encoding process for a particular sub-image. Any suitable number of ICH buffers greater than one can be employed depending upon the number of sub-images that have been segmented from the source image. In this example, the number of ICH buffers matches the number of sub-images of the source image. The horizontal pixel slice width of each of the sub-images is equal to the sub-image pixel width. Each of the multiple indexed color history buffers are configured to correspond to a single horizontal pixel slice of each sub-image that have the same pixel width as the sub-image width. The encoder 354 outputs encoded pixel data 370 for the different horizontal pixel slices for each of the plurality of sub-images as a single bitstream. For purposes of illustration, and not limitation, the encoder 354 will be described as a display stream compression (DSC) version 1.2a compliant encoder such as of the type defined by the VESA Display Stream Compression Standard v1.2a, 18 Jan. 2017 (incorporated herein by reference in its entirety). However, any suitable encoder that provides video compression in accordance with the disclosure may be employed. In contrast to a conventional DSC compliant encoder, encoder 354 includes control logic and multiple ICH buffer memories 362-368 that are used by a single encoder as further set forth below. Also, unlike conventional DSC compliant encoders, the image encoder apparatus 300 employs a bitstream splitter 356 which splits the encoded pixel data in the bitstream 370 into a plurality of independent encoded bitstreams 312-318 to produce a multi-stream output to provide separate compressed bitstreams corresponding to each of the sub-images 344 to each of the respective displays 328-334 via respective image decoders 304-310.

The source image segment generator 340 and multi-ICH buffer controller 350 utilize display configuration data, in one example, shown as 380 sent via any suitable mechanism including as part of an EDID communication, from the respective displays 328-334 indicating the respective display picture size for each display so that the source image segment generator 340 can segment the source image into, for example, equally sized sub-images. Also, the multi-ICH buffer controller 350 provides conventional configuration parameters to the encoder such as slice width (SLICE_WIDTH) and picture width (PIC_WIDTH). This information is sufficient to determine the number of slices. One ICH buffer is assigned to each slice by the encoder.

In this example, the source image segment generator 340 and the multi-ICH buffer controller 350 are implemented as part of an executing display driver that executes on a processor, such as a central processing unit or any other suitable processor. The image frame buffer controller 358, in this example is implemented as part of a graphics processing unit (GPU), such as a portion of a GPU core that suitably accesses the frame buffer 342. The GPU and CPU as known in the art may be implemented on a same integrated circuit, different integrated circuit or in any other suitable manner. It will be recognized that the multi-ICH buffer controller and source image segment generator 350 and 340 may also be implemented as a state machine, or any other suitable structure. In addition, the multi-ICH buffer controller 350 and source image segment generator 340 may also be implemented as part of the encoder 354 or any other suitable component.

Figure 4:
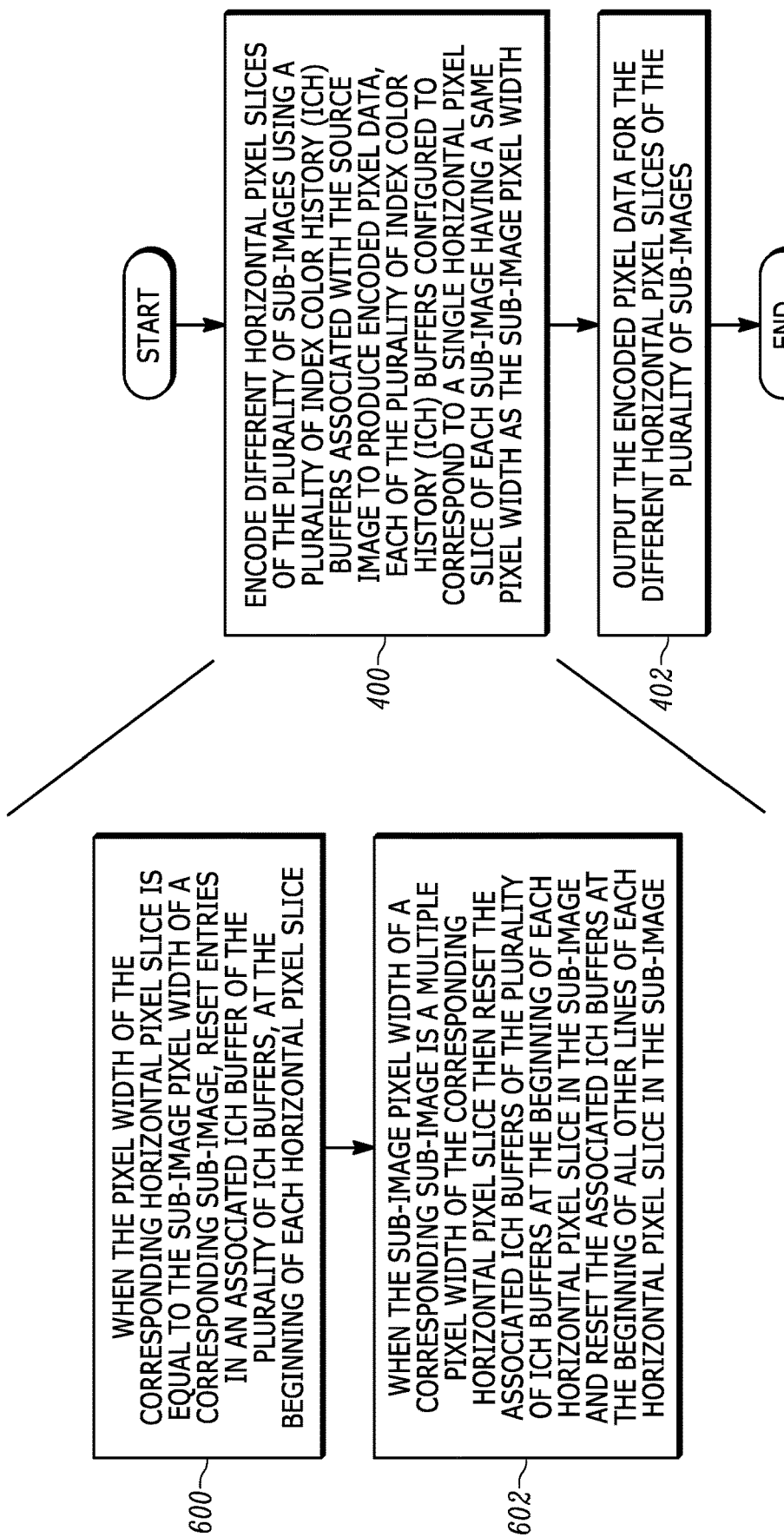
FIG. 4 is a flowchart illustrating one example of a method for encoding source image as set forth in the disclosure.

Referring also to FIG. 4, a method for encoding a source image that is segmented into the plurality of sub-images 344, will be described. In this example, the operations are carried out by the encoder 354. In operation, as shown in block 400, the encoder 354 with multiple ICH buffers encodes different horizontal pixel slices from each of the plurality of sub-images using the multiple indexed color history buffers 362-368 that are associated with the source image since each ICH buffer is used as part of an encoding process for each respective sub-image of the source image. The encoder 354 produces the encoded pixel data 370 as a non-DSC compliant bitstream in that a single compliment DSC compliant decoder received bitstream 370, the single decoder would expect that the single ICH at the decoder be reset at the beginning of each slice and each line of the slice. However, bitstream 370 has the ICH reset at the beginning of each slice only (in this example). Hence, bitstream 370 is not compliment because it does not adhere to the DSC standard. But using multiple ICH buffers and splitter 356 that provides bitstreams 312-318 to each of multiple decoders makes compliant bit streams 312-318 as further set forth below. As shown in block 402, the encoder 354 outputs the encoded pixel data 370 which contains encoded pixel data for different horizontal pixel slices of the plurality of sub-images 342. The encoded bitstream 370 contains encoded pixel data for the multiple image decoders 304-310 and their respective displays 328-334. By way of illustration where there are four displays each of 1024 horizontal pixels×2160 vertical pixels. The four displays are placed side by side forming a single large surface of 4096×2160 pixels. In this case, the slice width=sub-image width=1024 pixels.

Figure 5:
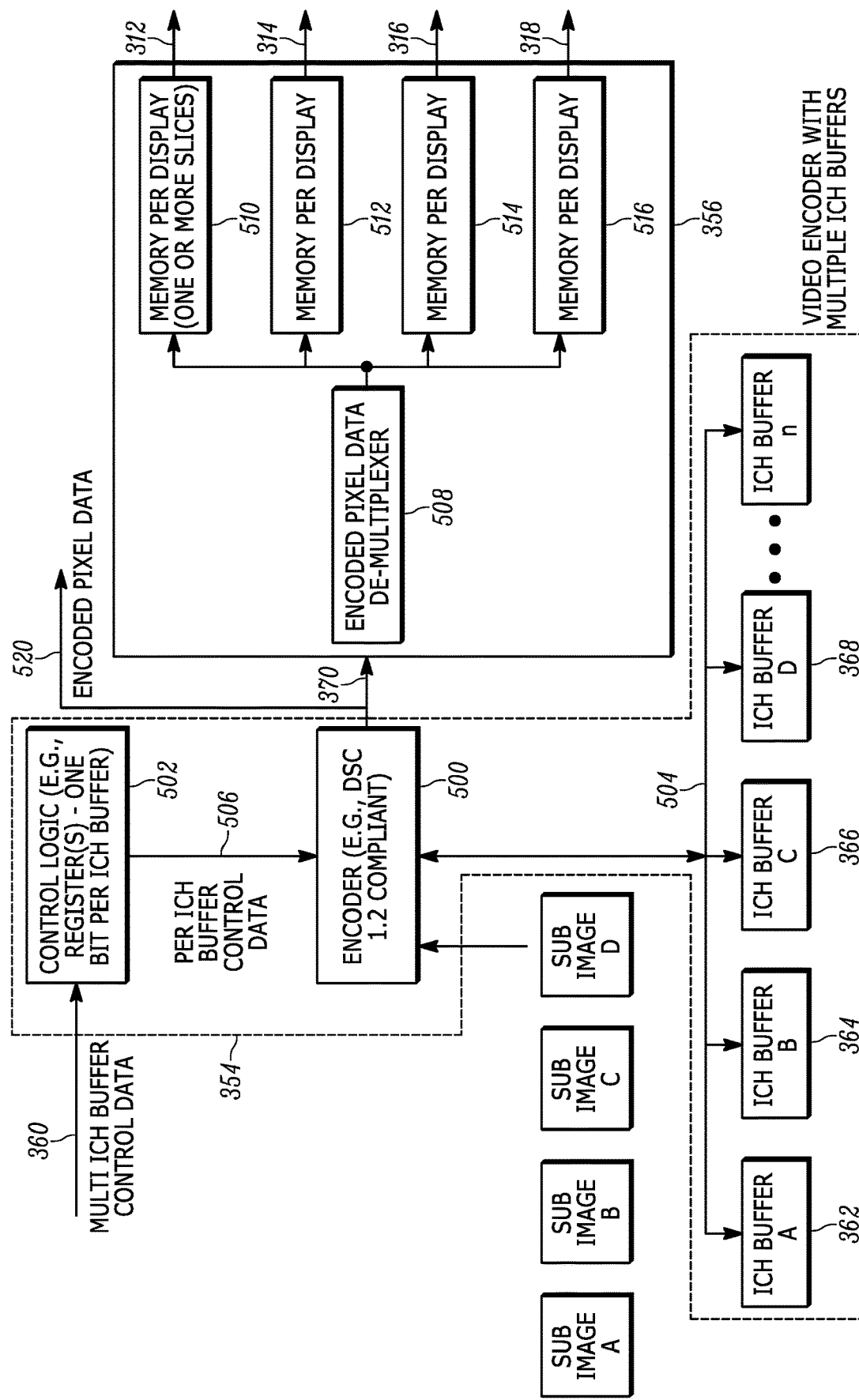
FIG. 5 is a diagram illustrating an example of an image encoder apparatus as set forth in the disclosure.

Referring to FIG. 5, the encoder 354 and bitstream splitter 356 are shown in more detail. The encoder 354 with multiple ICH buffers includes an encoder 500, such as a DSC version 1.2a compliant encoder and control logic 502. Communication links 504 such as buses are shown that to provide communication between the multiple ICH buffers 362-368 and the single encoder 500. The ICH buffers 362-368 in one example are implemented as cache memories such as flip flop based memories where each entry of an ICH buffer is searched each time a pixel is encoded. In one implementation the size of each entry is 13*4=52 bits. The total number of bits per ICH would then be 32 entries*52 bits=1,664 bits. The number of bits required for each ICH entry could be more or less if desired. The encoder 500 also includes suitable interface logic to communicate over the communication link 504.

The control logic 502 in this example is a control register that is part of a larger control register set that controls the encoder 500. The control logic 502 stores one bit per ICH buffer, so that in this example where there are four ICH buffers, the control logic includes four bits however any suitable mechanism may be used (for example, a single bit could be used that globally controls the plurality of the ICH buffers such that all ICH buffers are treated identically. However, this control mechanism may preclude the FIG. 8 812 case as this mechanism would not describe the mix of reset behaviors for DISPLAY A, DISPLAY B, and DISPLAY D). Each bit designates for the encoder 500 how the encoder is to reuse a respective ICH buffer from a reset behavior perspective.

The control logic 502 provides control data 506 (e.g., logic one or zero) on a per-ICH buffer basis to independently control each of the multiple indexed color history buffers 362-368 to reset respective ICH buffer entries at the beginning of each horizontal pixel slice as further described below. The multi-ICH buffer control data 360 controls the reset behavior of the ICH buffers 362-368, in one example depending upon whether a pixel width of a corresponding horizontal pixel slice is equal to or is a multiple of, the sub-image pixel width of a corresponding sub-image as further described below. As such, the encoder 354 is responsive to the multi-ICH buffer control data 360 to use different indexed color history buffer reset behavior for different ones of the plurality of ICH buffers 362-368 depending upon whether a pixel width of a horizontal pixel slice used by the encoder 500 is equal to or a multiple of a sub-image pixel width of a corresponding sub-image.

The encoded pixel data de-multiplexer 508 demuxes the encoded pixel data 370 in the bitstream from the encoder and accumulates the encoded pixel data for each respective sub-image in respective display stream queues 510-516. As such, encoded chunks from each slice in a sub-image are accumulated on a per-sub-image basis until a complete display line or less than a display line is available on a per-sub-image basis. The encoded pixel data 370 is queued in the display stream queues 510-516 as independent encoded bitstreams for a respective display of a plurality of displays. The independent encoded bit streams include Picture Parameter Set (PPS) information such that when SLICE_WIDTH*N==PICTURE_WIDTH and N=1, reset at the beginning of the slice. When N>=2, reset at the beginning of the slice and each line. This informs the corresponding decoder how to decode a received encoded bitstream. The PPS information provided to each decoder can be sent as part of the encoded data or as a separate data package, or in any suitable manner. The PPS information is sent to each display and is based on the slice width and picture width.

Referring also to FIG. 6, a method for encoding source image data that is segmented into a plurality of sub-images is further described and in particular, the multiple ICH buffer reset behavior. For example, the encoding operation shown in block 400 of FIG. 4 may be carried out by the encoder 500 under control of the per-ICH buffer control data 506 to apply different ICH buffer reset behaviors to different of the multiple ICH buffers depending upon the settings in the control logic 502. For example, as shown in block 600, in response to the per-ICH buffer control data 506 when encoding, for example, sub-image A, the encoder 500 uses ICH buffer A designated as 362 to encode the sub-image A using the ICH encoding algorithm as would be carried out by a DSC version 1.2(a) compliant encoder. However, the encoder 500 applies a per ICH buffer reset behavior such that when the pixel width of a corresponding horizontal pixel slice is equal to the sub-image pixel width of a corresponding sub-image, such as when the pixel width of sub-image A is equal to the horizontal slice width used by the encoder 500 on that sub-image, the encoder 500 resets entries in the ICH buffer A 362 for sub-image A at the beginning of each horizontal pixel slice. For example, all most recently used entries of the ICH buffer A 362 are invalidated. Where a DSC compliant encoder is used, DSC standard configuration parameters are used such as the Picture Parameter Set (PPS). The PPS contains the SLICE_WIDTH and PICTURE_WIDTH. The per-ICH buffer control data 506 is, for example, a logical 0 to indicate this reset history buffer and is set to a logical 1 for a particular ICH buffer for a different ICH buffer reset behavior. However, any suitable logic level or number of bits can be used.

As shown in block 602, the control data 506 indicates that for a particular ICH buffer that when the sub-image pixel width of a corresponding sub-image is a multiple of slice width (such as 2, 3 or 4 of a corresponding horizontal pixel slice width) such as for example, the sub-image pixel width may be twice the width of a horizontal pixel slice, the encoder 500 then resets the ICH buffer at the beginning of each horizontal pixel slice in the sub-image and configures the ICH buffer to be reset at the beginning of all other lines of each horizontal pixel slice in the sub-image. In this manner, because multiple ICH buffers are employed, ICH buffers have the same reset behavior to reset ICH buffer entries at the beginning of each horizontal pixel slice when the sub-image pixel width is equal to the horizontal pixel slice width, or different ICH buffers can have different reset behaviors.

The bitstream splitter 356 includes an encoded data de-multiplexer 508 that de-multiplexes the encoded pixel data from the encoded pixel bitstream 370 into separate encoded bitstreams 312-318 to provide a multi-stream output of the encoder 354. In this manner, each of the different displays receives their own DSC compliant bitstream that was encoded using a respective ICH buffer by the same encoder instance. On the decoding side, the displays employ a conventional DSC compliant decoder to decode an encoded sub-image being communicated via the respective bitstream. As such, each encoded bitstream 312-318 corresponds to a different respective sub-image of the source image and is also associated with a different display device. The bitstream splitter 356 includes a plurality of memories (also referred to as queues) 510, 512, 514, 516 that each accumulate encoded pixel data associated with a particular sub-image until a complete horizontal line or less than a horizontal line of a sub-image is available for output. The single encoded bitstream 370 is converted into multi-bitstream output via the bitstream splitter 356.

Figure 7:
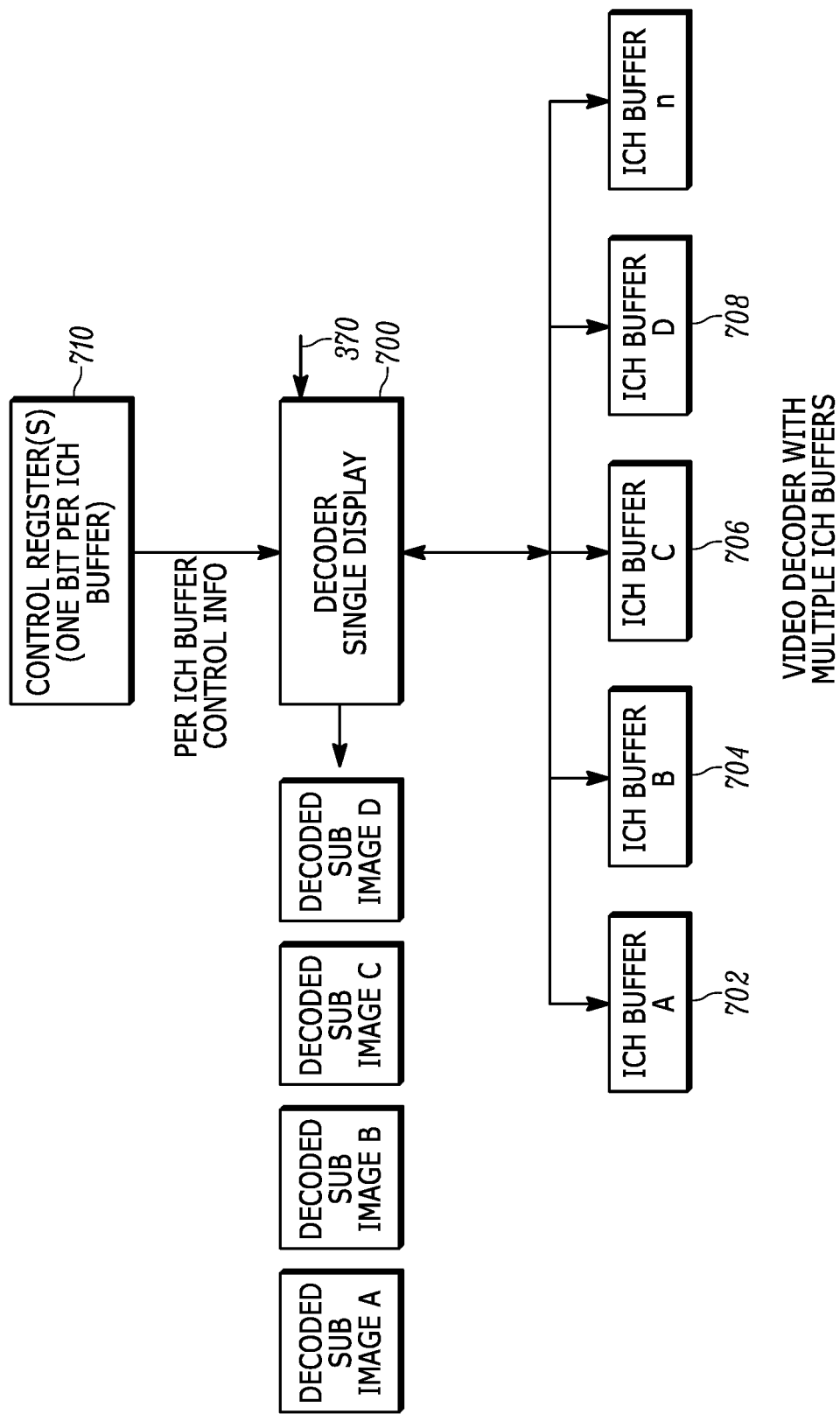
FIG. 7 illustrates one example of a decoder for decoding a source image in accordance with one example set forth in the disclosure.

In another embodiment, it may be desirable to output the encoded source image that was encoded using the multiple ICH buffer configuration to a single display (see FIG. 7). As such, the encoded pixel data 370 is also shown by arrow 520 which is communicated to a single display. In this embodiment, a decoder such as that shown in FIG. 7, also employs a corresponding plurality of ICH buffers 702, 704, 706 and 708 corresponding to ICH buffers 362-368 respectively. The decoder 700 for the single display is a DSC version 1.2(a) compliant decoder but modified to utilize the plurality of ICH buffers 702-708 in a reverse manner as was used by the encoder when using its ICH buffers 362-368. In this embodiment, each ICH buffer is reset only at the beginning of the slice. An advantage of this configuration may be that there is a greater chance that pixels can be encoded using the ICH entries which means that more bits in the encoding bit budget may be available for harder to compress parts of the source image. A control register 710 is used on the decoder side. The control register 710 must be set such that the ICH behavior for each encoded slice is identical on the decode side.

FIG. 8 diagrammatically illustrates resetting behavior for multiple ICH buffers performed by the encoder 354. As shown by 800, an encoded source image is encoded by controlling multiple ICH buffers to encode sub-images. In this example, the horizontal pixel slice width 802 is the same pixel width as the sub-images A-D. Two slices 804 and 806 are shown to be used to encode the sub-image A. In this example, each slice has a vertical length of four lines and each sub-image A-D is encoded using a different ICH buffer. Each of the ICH buffers (362-368) in this example are each controlled so that the encoder 500 resets entries at the beginning of each horizontal pixel slice shown as 808 and 810. This operation would be carried out to encode the sub-images shown in FIGS. 3 and 5.

In an alternative example, a sub-image is defined as having a pixel width that is a multiple of the horizontal pixel slice width, in this example shown as sub-image E 812 represented by dashed lines. As such, a source image is defined having differing sub-image widths and in this example, sub-image E would be displayed on a display D shown in FIG. 3 as a left and right image 390 (see FIG. 3). In this example, only three displays would be employed; displays A, B and D. Also if a single display is used such as display D, multiple ICH buffers are used with a single DSC encoder. When the sub-image pixel width is a multiple of the corresponding horizontal pixel slice, the encoder 500 resets the associated ICH buffers 366 and 368 in this example, at the beginning of each pixel slice 808 and 810 and also resets the ICH buffers at the beginning of all of the lines of each horizontal pixel slice in the sub-image shown as 814, 816 and 818. As such, sub-image E employs two ICH buffers 366 and 368 both of which have different reset behaviors than the ICH buffers 362 and 364 used to encode sub-image A and sub-image B. As such, the disclosed system in one example employs different reset behaviors for different ICH buffers of the plurality of ICH buffers. As illustrated, the same reset behavior is used for other vertical slices for each sub-image. In another example the encoder resets the only at the start of each slice and not at the start of each line, even though there are multiple ICH buffers used per sub-image.

The disclosed structure and operation can also be used in a conventional DSC compliant manner where a single display is employed and only one ICH buffer of the plurality of buffers is enabled. In this example, the display driver is controlled through user input or any other suitable input to switch between a "single ICH buffer mode" and a "multiple ICH buffer mode". In the multiple ICH buffer mode, the multiple ICH buffers 362-368 are employed to output data for multiple displays as described above wherein in the single ICH buffer modes only one ICH buffer is enabled for providing encoded data to a single display and the others are put in a low power state to save power. The encoder receives data, referred to as mode selection data, indicating when to operate in a multiple indexed color history (ICH) buffer mode that uses a plurality of indexed color history buffers by the video encoder and when to operate in a single ICH buffer mode that uses one of a plurality of ICH buffers. The mode selection data in one example is automatically determined based on the number of displays that are to be used. When one display is to be used then the single ICH buffer mode is selected. When multiple displays are to be used then the multiple ICH buffer mode is selected. The generator 340 selects the mode in one example. When operating in the multiple indexed color history mode, the video encoder encodes the source image that is segmented into a plurality of sub-images each having a sub-image pixel width, using the plurality of indexed color history (ICH) buffers associated with the source image to produce encoded pixel data, each of the plurality of indexed color history (ICH) buffers configured to correspond to a single horizontal pixel slice of each sub-image having a same pixel width as the sub-image pixel width.

It will be noted that the "multiple ICH buffer mode" may also be selected to output a source image on a single display using a single bitstream as shown for example in FIG. 7 as previously described. This mode is selected when enhanced quality is desired on a single display. A user may select this mode or the mode may be selected in any suitable manner including by communicating with the display. The source image segment generator 340 (e.g., display driver executing on CPU) sets the different operating modes of the encoder 354 depending upon the number of displays that are detected and/or whether a particular display indicates that it is capable of operating using multiple ICH buffers to output a single source image on one display.

In another example, the encoder may operate in a "mixed mode" that uses multiple ICH buffers such that at least one of the ICH buffers has a same horizontal pixel slice width as the sub-image pixel width and, referring to FIG. 8, sub-image E is encoded using another of the ICH buffers of the plurality of buffers to encode sub-images that have multiple horizontal slice widths. For displays that have a sub-image width equal to slice width, one ICH reset mode is used and for displays that have a sub-image width of a multiple of slice width, the other ICH reset mode is used.

Stated another way, the above encoder structure encodes more than one stream at a time using a single encoder when multiple displays are employed. An example system architecture of an encoder 354 with multiple ICH buffers used to encoder multiple bitstreams is described. The output of the encoder with multiple ICH buffers goes to a splitter which splits the bitstream at the slice boundaries (or multiples of slice boundaries). Each of the split bitstreams form another valid bitstream which can each be independently decoded by a decoder. Each decoder then reconstructs its respective image encoded into its bitstream.

This system uses independent sub-images that are each aligned to slice boundaries such that no slice contains pixel data from any two adjacent images. Sub-images A to D are not necessarily required to be of equal width, however, their widths are required to be integer multiples of each other. In the case where the slice width is equal to the sub-image width, then for that slice, the ICH buffer invalidation behavior is configured via register control to be as 'an image that has exactly one slice in the horizontal direction'. In the case where the slice width is not equal to the sub-image width, then for that sub-image's slices, the ICH buffer invalidation behavior is configured via register control to be as 'an image that has more than one slice in the horizontal direction'.

Without the multiple ICH buffers in the encoder, in the case where any of the sub-image widths are equal to a slice width, then it would not be possible to encode that slice in a DSC compliant manner. The reason for this is that, without the multiple caches in the encoder, the encoder would have been forced to invalidate the shared ICH buffer elements and, after the splitter, bitstreams carrying only a single slice would have the incorrect invalidate behavior. Instead of having the 'an image that has exactly one slice in the horizontal direction' behavior, the split bitstream would have the 'an image that has more than one slice in the horizontal direction' behavior. With the incorrect ICH buffer invalidate behavior, the decoder would incorrectly decode the incoming bitstream. Thus, a single encoder with multiple ICH buffers can produce multiple compliant bit streams.

Given a system where there are multiple slices in the horizontal direction and encoder and decoder are able to negotiate that the ICH buffers are invalidated only at the beginning of a slice, then having multiple ICH buffers can improve the image quality. A reason for this is that there is a greater chance that pixels can be encoded using the ICH entries which means that more bits in the bit budget may be available for harder to compress parts of the source image using either MPP, MMAP, or BP encoding schemes. Thus, a single encoder with multiple ICH buffers can improve the compressed image quality. The techniques can be applied to systems that employ multiple display cables or a single cable carrying multiple streams such those using DisplayPort Multi-Stream Transport (MST) protocol or the embedded DisplayPort Multi-SST Operation (MSO) protocol or any other suitable systems and protocols.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure is created using such integrated circuit fabrication systems. In such a system, the computer readable medium stores instructions executable by one or more integrated circuit design systems that causes the one or more integrated circuit design systems to produce an integrated circuit. The integrated circuit includes logic operative to encode different horizontal pixel slices of the plurality of sub-images using a plurality of indexed color history (ICH) buffers associated with a source image to produce encoded pixel data, each of the plurality of indexed color history (ICH) buffers are configured to correspond to a single horizontal pixel slice of each sub-image having a same pixel width as the sub-image pixel width. The logic is operative to output the encoded pixel data for the different horizontal pixel slices of the plurality of sub-images and independently control each of the plurality of indexed color history (ICH) buffers to reset ICH buffer entries in each of the plurality of ICH buffers at the beginning of each horizontal pixel slice and other of the operations set forth herein as desired. The executable code also causes the integrated circuit design system to fabricate logic that is operative to carry out other operations described herein.

The above detailed description and the examples described therein have been presented for the purposes of illustration and description only and not for limitation. For example, the operations described may be done in any suitable manner. It is therefore contemplated that the present embodiments cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A non-transitory storage medium comprising executable instructions thereon that when executed by one or more processors, causes the one or more processors to:
   encode different horizontal pixel slices of a plurality of sub-images using a plurality of indexed color history (ICH) buffers associated with a source image to produce encoded pixel data, each of the plurality of indexed color history (ICH) buffers configured to correspond to a single horizontal pixel slice of each sub-image; and
   output the encoded pixel data for the different horizontal pixel slices of the plurality of sub-images.

2. The non-transitory storage medium of claim 1 comprising executable instructions thereon that when executed by one or more processors causes the one or more processors to independently control each of the plurality of indexed color history (ICH) buffers to reset ICH buffer entries in each of the plurality of ICH buffers at the beginning of each horizontal pixel slice.

3. The non-transitory storage medium of claim 2 comprising executable instructions thereon that when executed by one or more processors causes the one or more processors to use different indexed color history (ICH) buffer reset behavior for different ones of the plurality of ICH buffers associated with the source image, depending on whether a pixel width of a corresponding horizontal pixel slice is equal to or a multiple of the sub-image pixel width of a corresponding sub-image.

4. The non-transitory storage medium of claim 3 comprising executable instructions thereon that when executed by one or more processors causes the one or more processors to:
   when the pixel width of the corresponding horizontal pixel slice is equal to the sub-image pixel width of a corresponding sub-image, resetting entries in an associated ICH buffer of the plurality of ICH buffers, at the beginning of each horizontal pixel slice; and
   when the sub-image pixel width of a corresponding sub-image is a multiple pixel width of the corresponding horizontal pixel slice then resetting the associated ICH buffers of the plurality of ICH buffers at the beginning of each horizontal pixel slice in the sub-image and resetting the associated ICH buffers at the beginning of all other lines of each horizontal pixel slice in the sub-image.

5. The non-transitory storage medium of claim 1 comprising executable instructions thereon that when executed by one or more processors cause the one or more processors to produce multiple display data streams for a plurality of display devices by producing a plurality of independent encoded bitstreams from the encoded pixel data, each encoded bit stream corresponding to a different respective sub-image of the source image.

6. A non-transitory storage medium comprising executable instructions thereon that when executed by one or more processors causes the one or more processors to decode an encoded source image that is segmented into a plurality of sub-images each having a sub-image pixel width by:
   decoding an encoded source image, the encoded source image comprising encoded pixel data for different horizontal pixel slices of the plurality of sub-images, using a plurality of indexed color history (ICH) buffers associated with each of the sub-images, each of the plurality of indexed color history (ICH) buffers configured to correspond to a single horizontal pixel slice of each sub-image; and
   outputting decoded pixel data for each of the different horizontal pixel slices of each of the plurality of sub-images for display on a display device.

7. The non-transitory storage medium of claim 6 comprising executable instructions thereon that when executed by one or more processors causes the one or more processors to send display configuration data to an encoder that informs the encoder to encode a source frame by encoding different horizontal pixel slices of the plurality of sub-images using a plurality of encoder indexed color history (ICH) buffers associated with the uncompressed source image to produce the encoded pixel data, each of the plurality of encoder indexed color history (ICH) buffers configured to correspond to a single horizontal pixel slice of each sub-image having a same pixel width as the sub-image pixel width.

* * * * *